(No Model.)

P. ASHBERRY & W. BARNES.
MECHANICAL CLIPPER FOR ANIMALS.

No. 530,572. Patented Dec. 11, 1894.

Witnesses
T. A. Connor
Geo. M. Whitney.

Inventors
Philip Ashberry
Walter Barnes
by Francis Forbes
Attorney.

UNITED STATES PATENT OFFICE.

PHILIP ASHBERRY AND WALTER BARNES, OF SHEFFIELD, ENGLAND.

MECHANICAL CLIPPER FOR ANIMALS.

SPECIFICATION forming part of Letters Patent No. 530,572, dated December 11, 1894.

Application filed May 16, 1894. Serial No. 511,464. (No model.) Patented in England April 13, 1894, No. 7,360.

*To all whom it may concern:*

Be it known that we, PHILIP ASHBERRY, manager, and WALTER BARNES, ivory worker, subjects of the Queen of Great Britain, and residents of Sheffield, in the county of York, England, have invented a certain new and useful Improvement in Mechanical Clippers for Animals, (for which we have obtained a patent in Great Britain, No. 7,360, bearing date April 13, 1894,) of which the following is a specification.

This invention relates to improvements in mechanical clippers for cutting wool and hair, and refers particularly to the construction of the vibrating arm which drives the cutter.

The object of the present improvement is to reduce friction, and thus to improve the working of said arm without interfering with its adjustment to take up wear between the cutter and the comb or bottom-cutter.

Our invention is illustrated by the annexed sheet of drawings, in which—

Figure 1:
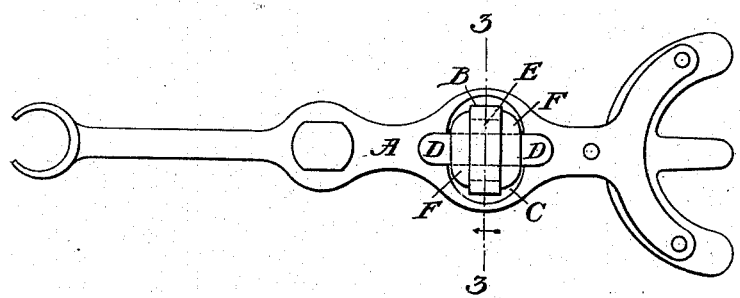
Figure 2:
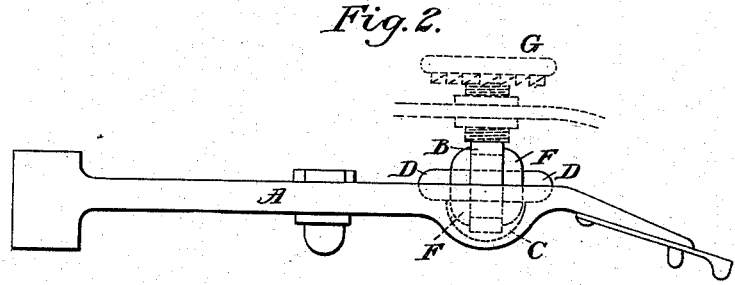
Figure 3:
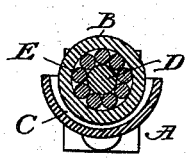

Figure 1 represents a plan view of the improved vibrating arm; Fig. 2, a side-elevation thereof, together with dotted outlines of a superposed adjusting-screw and its supports; and Fig. 3, a cross-section on the line 3—3 Fig. 1.

Like letters refer to like parts in all the figures.

In order to avoid friction between the end of a fixed pressure-screw (G) and that part of a vibrating arm upon which the end of the screw bears for the purpose of pressing the cutter firmly against the comb or bottom-cutter, we provide the arm A at this point with a hardened anti-friction roller B, the periphery of which constitutes a traveling path for the end of the screw to rest and press upon. A sunken recess C in the arm A conveniently admits the roller B and the ends of its axle D, while the bottom of the recess will retain a small quantity of lubricant so as to insure the thorough lubrication of the parts. The roller B is bored out to admit a circle of anti-friction rollers E around the axle D, and the several rollers are held in position by two collars F which fit tightly upon the axle. The remaining parts of the arm are old, and require no description to enable those skilled in the art to fully understand and apply the present improvement.

The recess C may extend through the arm A if preferred, and other like modifications will suggest themselves to those skilled in the art.

We are aware that prior to our invention, various contrivances have been made to reduce the friction between the pressure screw and the vibrating arm in mechanical clippers of the class to which our improved clipper relates, and we do not wish to be understood as including in our claims other anti-friction devices materially different from the roller B and its appurtenances as above described.

Having thus described the said improvement, we claim as our invention and desire to patent under this specification—

1. The combination with a vibrating arm of a mechanical clipper for animals of a roller B having an axle D and an intermediate circle of rollers E retained in position by collars F supported within a recess C in the arm A, and constituting a traveling path for the end of the pressure screw to bear upon, substantially as hereinbefore specified.

2. The combination in a mechanical clipper for animals of a vibrating arm A provided with an oil-retaining recess C, an axle D supported by its ends across said recess and provided with collars F and an anti-friction roller B revolving between said collars, substantially as hereinbefore specified, for the purpose set forth.

In testimony that we claim the foregoing as our own we have affixed hereto our signatures, in presence of two witnesses, this 28th day of April, 1894.

PHILIP ASHBERRY.
WALTER BARNES.

Witnesses:
ENSOR D. DRURY,
B. E. DRURY.